Jan. 19, 1937.　　F. H. MACKENZIE　　2,068,499
APPARATUS FOR MEASURING THE CONCENTRATION OF SOLUTIONS
Filed March 5, 1935　　2 Sheets-Sheet 2
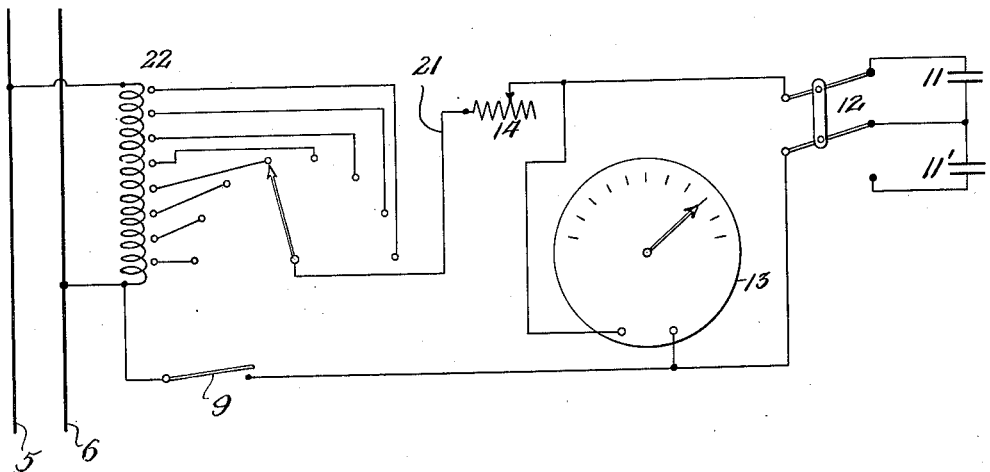
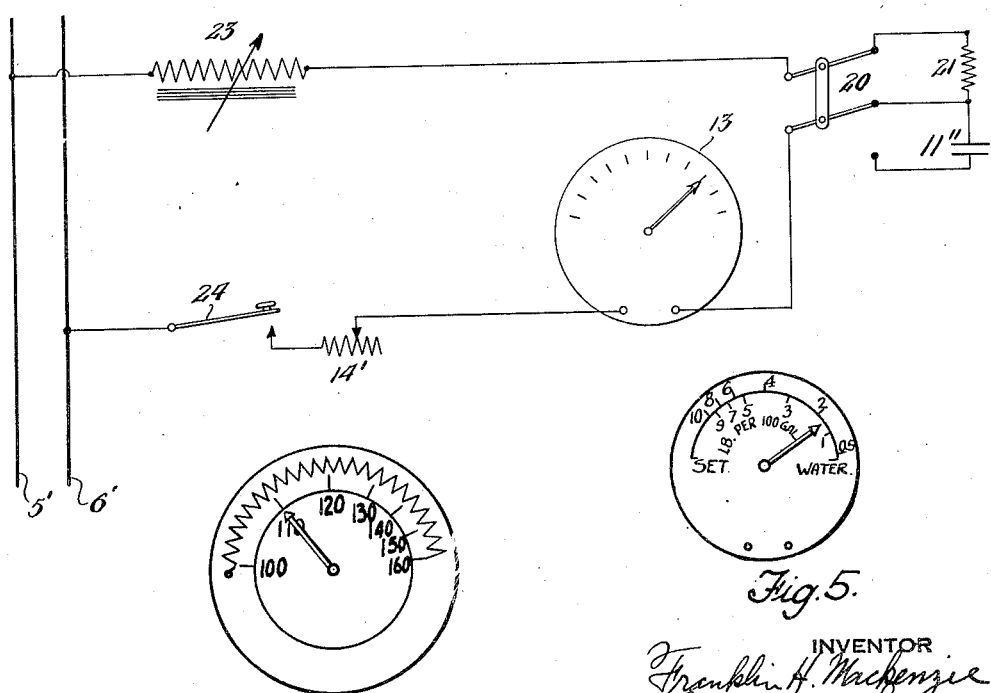

Patented Jan. 19, 1937

2,068,499

UNITED STATES PATENT OFFICE 2,068,499

APPARATUS FOR MEASURING THE CONCENTRATION OF SOLUTIONS

Franklin H. Mackenzie, Bywood, Pa., assignor to American Chemical Paint Company, Ambler, Pa., a corporation of Delaware Application March 5, 1935, Serial No. 9,519

2 Claims. (Cl. 175—183)

This invention relates to apparatus for measuring the concentration of solutions.

One of the primary objects of the invention is the provision of electrical measuring equipment of the type referred to which is effective, simplified as to construction and operation, and also otherwise improved, as will appear more fully hereinafter.

Among the other objects of the invention may be mentioned the arrangement of the equipment for operation on common and readily available sources of current such, for instance, as the ordinary 110 v., 60 cycle alternating current supply line; the arrangement of the equipment to provide direct concentration readings; the provision of means for compensating for temperature changes of the solution measured; the provision of means for compensating for variations in voltage of the supply line; and the provision of means for compensating for differences in the conductivity of the solvents used in preparing solutions.

How the foregoing objects and advantages are secured, together with others which will occur to those skilled in the art will be apparent from a consideration of the following description taken in connection with the accompanying drawings illustrating several embodiments of the invention, and in which—

Figure 3 is a view similar to Figure 1 but illustrating a modification;

Figure 4 is a view similar to Figure 2 but illustrating a still further modification, and Figures 5 and 6 are views illustrating the type of calibration adopted for certain instruments employed.

In the following description of the several diagrams it is to be understood that the voltage, resistance and other values given are only by way of example, since the desired result may still be secured even where the departure from the suggested values is relatively great. Furthermore, modifications of this type will necessarily be made in many instances to accommodate the equipment to measurement of concentration of widely differing solutions.

Figure 1:
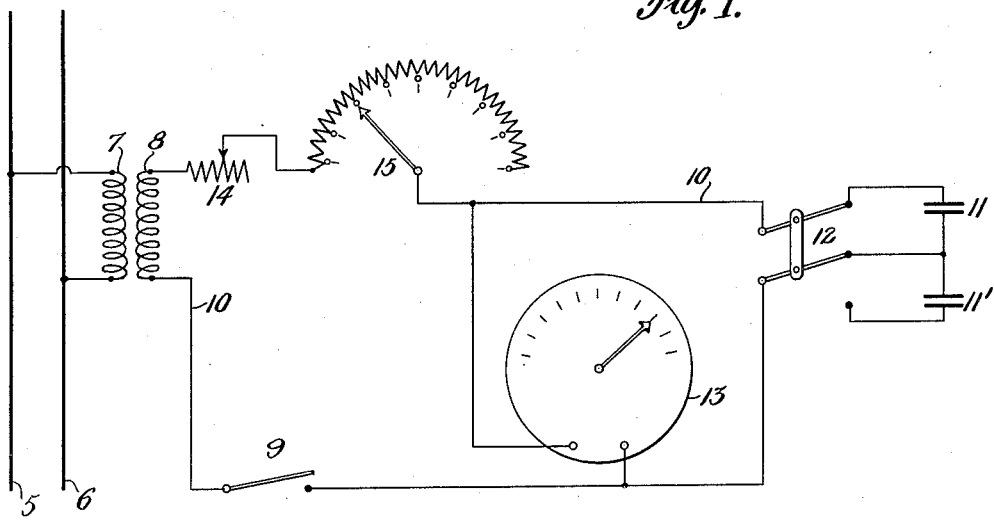
Figure 1 is a diagram of one embodiment of the invention which is especially suitable for the measurement of solution concentration in ranges in which the electrical conductivity is relatively high and in which changes of conductivity resulting from temperature variation are relatively small as compared with conductivity changes resulting from variation in concentration.

In Figure 1 a power line, such as the common 110 v., 60 cycle supply, is indicated by the numerals 5 and 6. While this potential may be employed directly, I prefer to use a step-down transformer in order to reduce the voltage in the equipment to a point, for example, 12 v., which is safer for ordinary handling. Such a transformer appears at the left of Figure 1, and is shown as having its primary 7 connected across the power line and its secondary 8 coupled with the equipment now to be described.

Any suitable make-and-break switch 9 may be employed in the instrument circuit 10 which, of course, receives its current from the secondary 8. The circuit 10 may be connected with a pair of electrodes 11 either directly or by switch 12, the purpose of which latter is to provide for the alternative connection of any one of a number of other pairs of electrodes such, for instance, as that shown at 11'. In this way the equipment may be used in the measurement of concentration of solutions in a multiplicity of different receptacles, each having a pair of electrodes 11. As to the electrodes themselves, these are preferably made of some material not subject to attack by the ingredients of the particular solution to be measured. The electrodes, of course, will also be insulated from each other and preferably mounted in fixed relative positions, i. e., so mounted as to maintain the spacing constant. If desired, a large tank may be equipped with more than one pair of electrodes, these being located at different points, for instance, one toward the bottom and one toward the top, so that the concentration in different zones may be measured.

In the arrangement of Figure 1 a voltmeter 13 is coupled in parallel with electrodes 11, and during operation this meter will respond to fluctuations of voltage across circuit 10, which fluctuations, of course, correspond with the conductivity and thus the concentration of the solution. In the arrangement of Figure 1 the meter may be a common A. C. voltmeter of about 10 v. range, and I prefer to calibrate this meter in units of concentration. The calibration of concentration units as indicated in Figure 5, will be inverted with reference to the voltage calibration since, in general, the voltage will decrease as the concentration (and conductivity) increases, and vice versa. Note further that I prefer to choose a meter having a voltage range of a spread considerably greater than necessary insofar as the calibration of concentration is concerned, this for the reason that the common types of A. C. voltmeters are quite sensitive and accurate in about the upper half of the voltage range, although the accuracy decreases appreciably toward the lower end of the range. Thus, in the preferred meter arrangement the minimum concentration indication will be placed at the high-voltage end of the scale, and the maximum concentration indication will be placed in the neighborhood of the middle of the scale.

The minimum concentration, of course, will correspond with the conductivity of the solvent used in preparing the solutions, and for purposes of identification I prefer to mark the "zero" end of the concentration graduations as "water".

With this equipment, the flow of current in the circuit 10 and between the electrodes 11 in a solution will afford a concentration reading on the voltmeter. There are, however, certain factors which must be compensated for in order to obtain an accurate reading. In the first place, the normal voltage of the power line may be different in different localities and the voltage may vary from time to time in accordance with fluctuations in the supply line, and with this in mind I introduce a variable impedance or resistance in the circuit 10. In the arrangement of Figure 1 this device takes the form of a variable rheostat 14 having, for example, 20 ohms maximum resistance. This rheostat serves to vary the voltage applied to the electrodes and may be employed not only to correct for fluctuations in the voltage of the supply line but also to compensate for differences in the conductivity of the solvent employed in making up solutions. Compensation for these factors may be accomplished by immersion of electrodes 11 into a receptacle containing pure solvent. In an industrial plant this solvent will quite usually be derived from the available source of water. With the circuit 10 closed by means of switch 9, the resistance 14 is adjusted until the voltmeter needle registers with the "water" indication on the concentration scale. Thus it will be seen that the resistance or equivalent device 14 serves to compensate for two variables, although, in a given installation, with a substantially uniform current and water supply, an adjustment of the device 14 would be necessary only very rarely.

Another important factor which must be compensated for in order to secure accurate readings is the temperature of the solution being measured. In accordance with this invention, this compensation is taken care of by the use of an additional resistance or equivalent device 15 which, as shown in Figure 1, may suitably take the form of a 20 ohm rotary rheostat. To facilitate use of the equipment in taking measurements, I prefer to calibrate this rheostat 15 in units of temperature so that the operator need only take a temperature reading from the solution being measured and then adjust rheostat 15 to the corresponding value.

The initial calibration of the device 15 may be accomplished in the following manner:

Assume that the equipment of Figure 1 is to be used for the measurement of concentration of common salt in water. For this purpose, the adjustment of resistance 14 referred to above is first carried out while the electrodes 11 are immersed in the water to be employed as solvent. Preferably this sample of the water is brought to a known temperature at about the middle of the range over which the solution is to be allowed to vary. While this is being done rheostat 15 is set at its minimum value.

The rheostat 15 is now moved to a point near the middle of its range and the electrodes 11 are placed in a salt solution of known concentration at a known temperature, preferably at about the middle of the range to be encountered. The needle of the meter 13 is observed and a suitable marking is applied to its scale. This operation may be repeated several times with sample salt solutions at the same known temperature but of different concentration, and in each instance suitable marking is applied to the scale of meter 13.

Rheostat 15 may now be calibrated by employing a sample solution of known concentration at about the middle of the concentration range. The electrodes 11 are immersed in this solution and the temperature thereof brought to a plurality of different points within the range to be covered. At each temperature the rheostat 15 is adjusted to bring the meter needle to the proper concentration marking and the position of the rheostat control is marked on the scale of the rheostat. A typical calibration of the rheostat 15 is shown in Figure 6.

It may here be noted that since, in general, the resistance of electrolytes falls with rising temperature, the temperature calibrations on the scale of rheostat 15 will be arranged to bring the highest temperature reading adjacent the highest resistance value of the rheostat.

Modifications of the procedure in calibrating might be made. For example, the order of calibration might be inverted and the rheostat 15 calibrated first. With further reference to the matter of calibration it is to be understood that various expressions such as "calibration" and "calibrated in units of concentration" (or temperature) are used in a broad sense. Obviously any arbitrarily chosen indicia or markings may be adopted. The calibrations appearing in Figures 5 and 6 are illustrative only.

In any event, the calibration of the scale of rheostat 15 in degrees of temperature and of the scale of meter 13 in units of concentration may readily be accomplished by employing sample solutions of known concentration and temperature and following through a series of manipulations as suggested above. It should further be understood that the calibration must necessarily be different with different electrolytes, although if desired, multiple calibrations for different electrolytes may be applied to the scales of the meter 13 and rheostat 15. Once the initial calibration is completed, the apparatus may very readily be employed to secure direct readings of concentration, the manipulations necessary being extremely simple and therefore virtually foolproof. Assuming, by way of example, that the equipment of Figure 1 is calibrated for the measurement of solutions of common salt, the operator need only immerse a pair of electrodes 11 in any particular solution to be measured, determine the temperature of this solution and then adjust rheostat 15 to that temperature. A direct reading of concentration will now be given by the meter 13.

As indicated above, the layout of Figure 1 is especially suitable for the measurement of solutions having relatively high conductivity and in which variation in conductivity as a result of temperature change is relatively slight as compared with variation in conductivity as a result of changes in concentration. In instances where the reverse condition is encountered or where the fluctuations in conductivity as a result of temperature change are comparatively large, I prefer a somewhat modified arrangement of the equipment, as shown, for instance, in Figure 2. Here again a step-down transformer coupled with the supply line 5—6 is also employed. In this instance the primary and secondary windings 16 and 17 may desirably be proportioned to deliver a slightly higher voltage to the measuring apparatus, for example, in the neighborhood of 20 v. The instrument circuit 18 is also provided with a switch 9 as well as a resistance or equivalent device 14' serving a purpose somewhat similar to that of the resistance 14 of Fig. 1. In this arrangement the meter 13, which may also be of about 10 v. range, has a series connection with the electrodes 11". As will readily be seen, this is somewhat different than the layout of Figure 1, and in this instance I prefer to employ a resistance 19 having a large range, for example, 100 ohms, as the means for compensating for temperature fluctuations. It will be observed, however, that in both of Figures 1 and 2 the rheostat used for compensation of temperature fluctuations is in series both with the meter 13 and with the electrodes 11.

Figure 2:
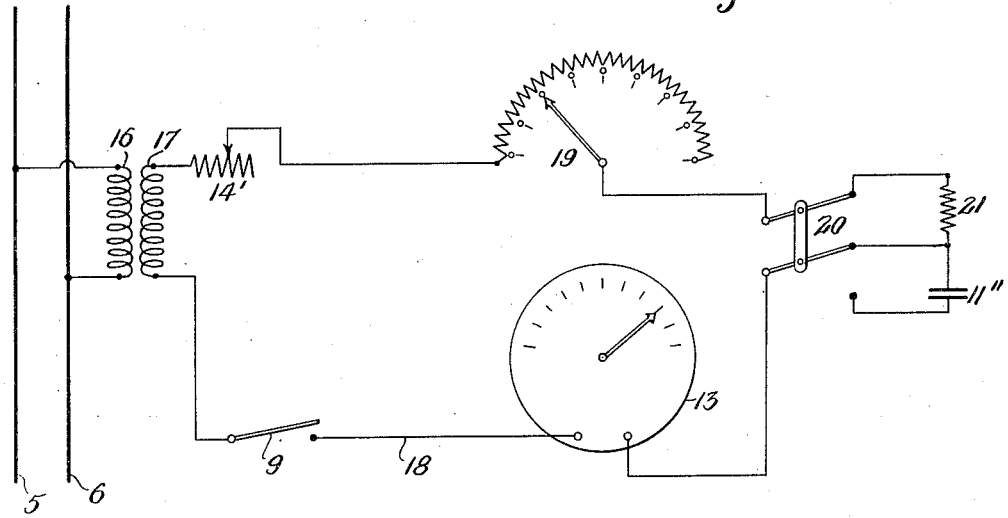
Figure 2 is a diagram of an embodiment of the invention especially suitable for the measurement of concentration of solutions in ranges where the conductivity changes due to temperature variations are relatively large.

In the showing of Figure 2, while only one pair of electrodes 11 are illustrated, any suitable number may be provided and these, of course, may alternatively be coupled into the circuit 18 by means of a switch 20. I prefer to provide for the connection of a resistance 21 into circuit 18 in place of a pair of electrodes 11, and this may also be accomplished by the switch 20 as shown. Resistance 21 may have a value in the neighborhood of 60 ohms and is employed only for calibration purposes in accordance with the following. In this case, assume that the apparatus is to be used in measuring the concentration of sodium carbonate in water.

With the resistance 21 placed in the circuit 18 and with the switch 9 closed, the temperature compensating rheostat 19 is preferably set in the neighborhood of its mid-point and the resistance 14' is then adjusted until the meter 13 registers maximum voltage.

In the initial setting and calibration of the equipment of Figure 2, the meter 13 is calibrated in units of concentration over a range corresponding with the range which it is desired to measure, and because of the connections here employed the minimum point on the concentration scale will coincide with the minimum voltage reading, and the maximum concentration point will coincide with the maximum voltage reading. Furthermore, the rheostat 19 is calibrated over the range of temperatures which must be compensated for, for example, from 60° F. to 140° F. Because of the difference in the connections of Fig. 2 as compared with Fig. 1, the highest temperature reading on the scale of rheostat 19 will be placed adjacent the minimum resistance value.

Thus it will be seen that the mid-point (to which the rheostat 19 is set when commencing calibration) will correspond to about 100° F.

Subsequent to the initial adjustment of rheostat 14', as mentioned above, the resistance 21 is taken out of the circuit and a pair of electrodes 11 are immersed in a sample of the water to be used as a solvent. The temperature of this sample is noted and the rheostat 19 adjusted to the corresponding value. After this adjustment the needle of the meter 13 is set to the zero mark (minimum concentration), as by means of the meter needle-reset screw, provided on such instruments.

The foregoing procedure provides calibration so that direct readings of concentration may again be secured merely by obtaining the temperature of the solution to be measured and adjusting the rheostat 19 to that value.

The arrangement of Figure 3, especially as to general operation and initial calibration, is very similar to that of Figure 1. In this instance, however, the instrument circuit 21 is coupled with the supply line 5—6 by means of an autotransformer 22 having a multiplicity of taps providing for voltage and impedance variation in the circuit 21. Rheostat 14 is again included in this layout for the purpose discussed above in connection with Figure 1.

The calibration of the arrangement of Figure 3 will be essentially the same as that for Figure 1, although the temperature values will be applied to the several taps of the transformer 22.

As to Figure 4, the general operation and calibration are similar to that for Figure 2. Here the rheostat 14' will again be employed for the initial calibration step when the resistance 21 is placed in the circuit. A variable impedance 23 is substituted in this system for the resistance 19, although its function and general operation are quite similar.

Figure 4 also illustrates the adaptation of the apparatus for direct connection to a low voltage A. C. supply line 5'—6'. The voltage in this line may be in the neighborhood of about 15 v. and the impedance 23 would have about 20 ohms maximum resistance at 60 cycles.

As a further modification, Figure 4 illustrates the application of a key 24, in place of switch 9 employed in Figures 1 to 3.

From the foregoing it will be seen that my improvement is capable of numerous variations without, however, departing from the general type of operation herein contemplated and while retaining at least most of the advantages, especially the obtaining of direct concentration readings which are properly corrected for temperature variations, line voltage fluctuation and differences in the purity or conductivity of solvents employed.

I claim:

1. Apparatus of the type described including, in combination with a source of electrical current, a pair of spaced electrodes adapted to be immersed in solutions of varying concentration, a circuit connecting said electrodes with said source, a voltmeter connected in parallel with said electrodes, a variable electrical device in said circuit in series with the electrodes and with the meter for compensating for fluctuations in the temperature of solutions to be measured, and a second variable electrical device also in series with the electrodes and with the meter for compensating for variations in electrical conductivity of the solvent used in preparing the solutions being measured.

2. Apparatus of the type described including, in combination with a source of electrical current, a pair of spaced electrodes adapted to be immersed in solutions of varying concentration, a circuit connecting said electrodes with said source, a voltmeter connected in parallel with said electrodes the meter being calibrated in units of concentration, a variable resistance in said circuit in series with the electrodes and with the meter for compensating for fluctuations in temperature of solutions to be measured, the resistance being calibrated in units of temperature, and a second variable resistance also in series with the electrodes and with the meter for compensating for variations in electrical conductivity of the solvent used in preparing the solutions being measured.

FRANKLIN H. MACKENZIE.